United States Patent
Anderson et al.

(10) Patent No.: US 7,606,766 B2
(45) Date of Patent: Oct. 20, 2009

(54) COMPUTER SYSTEM AND COMPUTER-IMPLEMENTED METHOD FOR SELECTING INVOICE SETTLEMENT OPTIONS

(75) Inventors: Matthew V. Anderson, Murray, UT (US); Greg A. Laufer, Park City, UT (US); Jeffrey R. Dye, Park City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 46 days.

(21) Appl. No.: 11/643,722

(22) Filed: Dec. 21, 2006

(65) Prior Publication Data

US 2008/0154769 A1     Jun. 26, 2008

(51) Int. Cl.
*G06Q 40/00* (2006.01)
(52) U.S. Cl. .............................. 705/40; 705/36; 705/38; 700/99
(58) Field of Classification Search .............. 705/35–45
See application file for complete search history.

(56) References Cited

U.S. PATENT DOCUMENTS

| | | | |
|---|---|---|---|
| 3,719,927 A | 3/1973 | Michels et al | |
| 4,491,725 A | 1/1985 | Pritchard | |
| 4,594,663 A | 6/1986 | Nagata et al. | |
| 4,734,564 A | 3/1988 | Boston et al. | |
| 4,812,628 A | 3/1989 | Boston et al. | |
| 4,891,503 A | 1/1990 | Jewell | |
| 4,916,611 A | 4/1990 | Doyle, Jr. et al. | |
| 5,036,461 A | 7/1991 | Elliott et al. | |
| 5,070,452 A | 12/1991 | Doyle, Jr. et al. | |
| 5,210,687 A | 5/1993 | Wolfberg et al. | |
| 5,301,105 A | 4/1994 | Cummings, Jr. | |
| 5,621,201 A | 4/1997 | Langhans et al. | |
| 5,631,828 A | 5/1997 | Hagan | |
| 5,649,116 A | 7/1997 | McCoy et al. | |
| 5,708,422 A | 1/1998 | Blonder et al. | |

(Continued)

FOREIGN PATENT DOCUMENTS

EP        0072183        2/1983

(Continued)

OTHER PUBLICATIONS

Phillips, Stephen- "Case Study—Orbiscom and Cyota", Sep. 5, 2001, download from http://specials.ft.com/ftit/sept2001/FT3D4SI86RC.html on Mar. 26, 2009, © 2001, The Financial Times.

(Continued)

*Primary Examiner*—Ella Colbert
*Assistant Examiner*—Clifford Madamba
(74) *Attorney, Agent, or Firm*—Snell & Wilmer L.L.P.

(57) ABSTRACT

A method of operating a computer system includes storing attributes of a buying organization, vendors, invoices and/or line-item details from invoices in one or more databases. Rules are established for selecting settlement options for the invoices. The rules are applied such that the computer system selects a first one of the settlement options to settle a first one of the invoices rendered by one of the vendors, and the computer system selects a second one of the settlement options to settle a second one of the invoices rendered by that vendor.

19 Claims, 11 Drawing Sheets

U.S. PATENT DOCUMENTS

| | | |
|---|---|---|
| 5,710,887 A | 1/1998 | Chelliah et al. |
| 5,715,403 A | 2/1998 | Stefik |
| 5,724,424 A | 3/1998 | Gifford |
| 5,732,400 A | 3/1998 | Mandler et al. |
| 5,748,908 A | 5/1998 | Yu |
| 5,757,917 A | 5/1998 | Rose et al. |
| 5,758,327 A | 5/1998 | Gardner et al. |
| 5,781,632 A | 7/1998 | Odom |
| 5,790,677 A | 8/1998 | Fox et al. |
| 5,797,133 A | 8/1998 | Jones et al. |
| 5,798,508 A | 8/1998 | Walker et al. |
| 5,822,737 A | 10/1998 | Ogram |
| 5,825,881 A | 10/1998 | Colvin, Sr. |
| 5,826,241 A | 10/1998 | Stein et al. |
| 5,826,245 A | 10/1998 | Sandberg-Diment |
| 5,832,447 A | 11/1998 | Rieker et al. |
| 5,850,446 A | 12/1998 | Berger et al. |
| 5,864,829 A | 1/1999 | Tago |
| 5,883,810 A | 3/1999 | Franklin et al. |
| 5,890,137 A | 3/1999 | Koreeda |
| 5,914,472 A | 6/1999 | Foladare et al. |
| 5,945,653 A | 8/1999 | Walker et al. |
| 5,991,750 A | 11/1999 | Watson |
| 6,000,832 A | 12/1999 | Franklin et al. |
| 6,006,205 A | 12/1999 | Loeb et al. |
| 6,014,650 A | 1/2000 | Zampese |
| 6,029,890 A | 2/2000 | Austin |
| 6,052,675 A | 4/2000 | Checchio |
| 6,163,771 A | 12/2000 | Walker et al. |
| 6,169,974 B1 | 1/2001 | Baumgartner et al. |
| 6,193,155 B1 | 2/2001 | Walker et al. |
| 6,226,624 B1 | 5/2001 | Watson et al. |
| 6,227,447 B1 | 5/2001 | Campisano |
| 6,324,526 B1 | 11/2001 | D'Agostino |
| 6,327,578 B1 | 12/2001 | Linehan |
| 6,330,544 B1 | 12/2001 | Walker et al. |
| 6,339,766 B1 | 1/2002 | Gephart |
| 6,360,209 B1 | 3/2002 | Loeb et al. |
| 6,453,296 B1 | 9/2002 | Iwamura |
| 6,456,984 B1 | 9/2002 | Demoff et al. |
| 6,598,031 B1 | 7/2003 | Ice |
| 6,636,833 B1 | 10/2003 | Flitcroft et al. |
| 6,748,367 B1 | 6/2004 | Lee |
| 6,901,387 B2 | 5/2005 | Wells et al. |
| 6,955,294 B1 | 10/2005 | Seegar |
| 7,117,172 B1 | 10/2006 | Black |
| 2001/0007098 A1 | 7/2001 | Hinrichs et al. |
| 2001/0011222 A1 | 8/2001 | McLauchlin et al. |
| 2001/0029473 A1 | 10/2001 | Yamaoka et al. |
| 2001/0032192 A1 | 10/2001 | Putta et al. |
| 2001/0034702 A1 | 10/2001 | Mockett et al. |
| 2001/0034720 A1 | 10/2001 | Armes |
| 2001/0037312 A1 | 11/2001 | Gray et al. |
| 2001/0042784 A1 | 11/2001 | Fite et al. |
| 2001/0047310 A1 | 11/2001 | Russell |
| 2001/0047330 A1 | 11/2001 | Gephart et al. |
| 2001/0047335 A1 | 11/2001 | Arndt et al. |
| 2001/0047336 A1 | 11/2001 | Maycock, Jr. et al. |
| 2001/0051917 A1 | 12/2001 | Bissonette et al. |
| 2001/0051924 A1 | 12/2001 | Uberti |
| 2002/0007320 A1 | 1/2002 | Hogan et al. |
| 2002/0035548 A1 | 3/2002 | Hogan et al. |
| 2002/0059146 A1 | 5/2002 | Keech |
| 2002/0065774 A1 | 5/2002 | Young et al. |
| 2002/0073045 A1 | 6/2002 | Rubin et al. |
| 2002/0077977 A1 * | 6/2002 | Neely et al. .................. 705/40 |
| 2002/0091646 A1 | 7/2002 | Lake et al. |
| 2002/0116327 A1 | 8/2002 | Srinivasan |
| 2002/0120587 A1 | 8/2002 | D'Agostino |
| 2002/0133467 A1 | 9/2002 | Hobson et al. |
| 2002/0161701 A1 | 10/2002 | Warmack |
| 2002/0174030 A1 | 11/2002 | Praisner et al. |
| 2003/0018567 A1 | 1/2003 | Flitcroft et al. |
| 2003/0028481 A1 | 2/2003 | Flitcroft et al. |
| 2003/0101145 A1 | 5/2003 | Fang et al. |
| 2003/0110136 A1 | 6/2003 | Wells et al. |
| 2003/0125969 A1 | 7/2003 | Kizer et al. |
| 2004/0078328 A1 | 4/2004 | Talbert et al. |
| 2004/0148254 A1 | 7/2004 | Hauser |
| 2004/0210531 A1 | 10/2004 | Barron et al. |
| 2004/0230536 A1 | 11/2004 | Fung et al. |
| 2005/0240522 A1 | 10/2005 | Kranzley et al. |
| 2006/0206425 A1 * | 9/2006 | Sharma ...................... 705/40 |
| 2007/0005498 A1 * | 1/2007 | Cataline et al. ............... 705/42 |

FOREIGN PATENT DOCUMENTS

| | | |
|---|---|---|
| EP | 0745961 | 12/1996 |
| EP | 1029311 | 6/2001 |
| EP | 1115095 | 7/2001 |
| JP | 10143556 | 5/1998 |
| WO | WO9930294 | 6/1999 |
| WO | WO9949424 | 9/1999 |
| WO | WO0049586 | 8/2000 |
| WO | WO0062259 | 10/2000 |
| WO | WO0129637 | 4/2001 |
| WO | WO 01/63520 A1 * | 8/2001 |
| WO | WO03069531 | 8/2003 |

OTHER PUBLICATIONS

Notice of Allowance; U.S. Appl. No. 08/957,419, filed Jun. 29, 1999.
Notice of Allowance; U.S. Appl. No. 09/276,289, filed Jan. 12, 2000.
Notice of Allowance; U.S. Appl. No. 09/276,289, filed Feb. 22, 2001.
Notice of Allowance; U.S. Appl. No. 10/064,151, filed Nov. 26, 2004.
Notice of Allowance; U.S. Appl. No. 11/005,593, filed Oct. 3, 2006.
Notice of Allowance; U.S. Appl. No. 10/801,765, filed Jun. 25, 2008.

* cited by examiner

_372_

VENDOR DATABASE

| NAME 602 | IDENTIFIER 604 | ADDRESS 606 | CONTACT INDIVIDUAL 608 | TERMS 610 | SETTLEMENT OPTIONS 612 |
|---|---|---|---|---|---|
| ACME MATERIALS CORP. | XYZ123456 | 55 ELM STREET NEW HAVEN, CT 02226 | JANE GREEN | NET 30; 0.1% EACH DAY EARLY UP TO 20 DAYS | ALL |
| STANDARD WIDGETS INC. | LMN252525 | 1219 TREMONT AVE. BRONX, NY 10096 | BOB BROWN | NET 45; 1.5% 15 DAYS | PCARD; PRIVATENET |
| CONSOLIDATED PLASTIFORM CORP | PQR733291 | 1050 OLD FARM RD. CHARLES CITY, IA 50616 | CARRIE LANE | NET 60;1% 30 DAYS 1.8% 10 DAYS | ALL EXCEPT PRIVATENET, ACH |

*FIG. 6*

INVOICE DATABASE 370

| VENDOR IDENTIFIER 702 | INVOICE IDENTIFIER 704 | P.O. NO. 706 | AMOUNT 708 | VENDOR TRANSACTION REFERENCE 710 | TERMS 712 |
|---|---|---|---|---|---|
| XYZ123456 | I-2006-77996 | P-2006-635536 | $45,129.00 | XKE-309765 | NORMAL |
| PQR733291 | I-2006-77997 | P-2006-634637 | $3,275.25 | JPJ-NL-25263 | NORMAL |
| PQR733291 | I-2006-778023 | P-2006-634518 | $120,015.00 | JPJ-NB-10063 | NET 90 |

*FIG. 7*

RULES DATABASE — 374

| RULES IDENTIFIER 802 | STRATEGY 804 | ALL BUT 806 | EXCLUDE 808 | ONLY FOR 810 | INCLUDE 812 |
|---|---|---|---|---|---|
| R-2006-00038 | MAX. FINANCIAL RETURN | X | GOVTS. AND UTILITIES; PLASTIC SUPPLIERS | --- | --- |
| R-2006-00032 | MAX. CASH | --- | --- | X | PLASTIC SUPPLIERS |

| RULES APPLICATION DATA | |
|---|---|
| FINANCIAL RETURN HURDLE RATE 902 | 18.0% |
| SHORT TERM CASH RATE 904 | 4.0% |
| SHORT TERM HURDLE 906 | 6.0% |
| TARGET DPO 908 | 30 DAYS |
| ACTUAL DPO 910 | 28 DAYS |
| CASH & EQUIVALENTS AVAILABLE 912 | $48,795,000.00 |

COMPUTER SYSTEM AND COMPUTER-IMPLEMENTED METHOD FOR SELECTING INVOICE SETTLEMENT OPTIONS

FIELD

The present invention relates generally to computer systems, and more specifically to computer systems useful in corporate procurement and accounts payable departments.

BACKGROUND

A typical large business (generally referred to herein as the "buyer" or "buying organization") may have numerous suppliers who collectively render many invoices for goods and services supplied to the purchasing business. The terms and conditions for the business's dealings with its suppliers, including payment terms, may vary from supplier to supplier. The buyer, thus, is faced with the complex issue of sorting through a large number of invoices, each possibly having a number of payment terms.

There are also a number of different methods of payment that a buyer may potentially use to pay each supplier in settlement of the invoices rendered to the business. For example, payment by paper check, mailed to the supplier, is one long-standing payment method.

Other available payment methods may include Automatic Clearing House (ACH) transactions, payment cards such as debit or credit cards issued by a national payment card association or the like, Electronic Data Interchange (EDI), and so-called "private networks" which allow for direct transfer of data between companies by a network such as the Internet. The variety of different payment methods make the already complex issue of sorting through invoices even more complex, as the buyer must not only process a large number of invoices having a variety of payment terms, but must also determine the appropriate payment method for each of the invoices.

The various payment methods that may be available may have different respective advantages and costs, which may vary from transaction to transaction. For example, in some situations, the most desirable payment method for an invoice (or invoice item) may be an ACH transaction, while another invoice (or invoice item) may be best suited for payment using a credit card. Existing payment systems do not provide a systematic approach for a buyer to analyze individual invoices to determine the appropriate terms and conditions as well as to determine the most desirable payment method.

SUMMARY

To alleviate problems inherent in the prior art, the present invention introduces improved computer systems and methods for operating computer systems for the purpose of automatically selecting invoice settlement methods on an invoice-by-invoice basis, targeted at maximizing the benefit of the settlement, processing, or other beneficial option for either the supplier or buyer.

According to one embodiment, a method of operating a computer system includes storing, in a database, a plurality of attributes with respect to the buying organization and/or each of a plurality of vendors. The method further includes storing, in a database (which may be the same as or different from the database previously referred to), data indicative of attributes of a plurality of invoices. Each of the invoices is rendered by a respective one of the plurality of vendors. The method also includes establishing at least one rule for selecting, from among a plurality of settlement options, a settlement option to be used for at least some of the invoices. In addition, the method includes applying the at least one rule to the invoices in a manner such that: (a) the computer system selects a first one of the plurality of settlement options to settle a first one of the invoices rendered by a first one of the vendors; and (b) the computer system selects a second one of the plurality of settlement options to settle a second one of the invoices rendered by the first one of the vendors. The second one of the plurality of settlement options is different from the first one of the settlement options.

According to another embodiment, a method of operating a computer system includes storing a first rule and a second rule in the computer system. The first rule is applicable to a first vendor, and the second rule is different from the first rule and is applicable to a second vendor that is different from the first vendor. The computer system applies the first rule to a first invoice rendered by the first vendor to select a first settlement option for the first invoice from among a plurality of settlement options. The computer system applies the first rule to a second invoice rendered by the first vendor to select a second settlement option for the second invoice from among the plurality of settlement options. The second settlement option is different from the first settlement option. The computer system applies the second rule to a first invoice rendered by the second vendor to select a selected settlement option for the first invoice rendered by the second vendor from among the plurality of settlement options. The computer system applies the second rule to a second invoice rendered by the second vendor to select another selected settlement option for the second invoice rendered by the second vendor from among the plurality of settlement options. The other selected settlement option is different from the selected settlement option for the first invoice rendered by the second vendor.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 6 is an illustration of a vendor database that may be stored in the computer system of FIGS. 1 and 2 and/or in the server computer of FIG. 3.

FIG. 7 is an illustration of an invoice database that may be stored in the computer system of FIGS. 1 and 2 and/or in the server computer of FIG. 3.

FIG. 8 is an illustration of a rules database that may be stored in the computer system of FIGS. 1 and 2 and/or in the server computer of FIG. 3.

FIG. 9 is an illustration of data that may be used in applying one or more of the rules stored in the rules database of FIG. 8.

DETAILED DESCRIPTION

Embodiments of the present invention provide an improved electronic payment processing system. The computer system which implements the payment processing system operates in a rules-based manner to select among various settlement options on an invoice-by-invoice basis. The operative settlement option selection rules may implement policy decisions in regard to cash management, maximization of early-payment discounts, or other goals. Rules for selecting among settlement options may apply to all suppliers, a selected group or groups of suppliers or to individual suppliers. Automated computerized rules-based selection of payment methods allows for graceful and effective handling of the complexity inherent in multiple payment options and numerous suppliers with whom varying arrangements may have been made.

The result is a system, method, apparatus, and means for processing which allows a buyer organization to efficiently process invoices using the most desirable payment method in the given situation. Pursuant to some embodiments, a buyer organization is able to electronically process each invoice and identify the payment methods that are available for the particular invoice. In some embodiments, the payment options are ranked based on their desirability, allowing the buyer organization to select the most desirable payment method available. In some embodiments, this processing may be done on a regular or scheduled basis (such as daily, for example) by processing a file of invoices (which may include a number of invoices from a number of different suppliers). A set of payment rules are applied to the file, and the most desirable payment methods are identified. These payment rules may change from time to time as the financial situation and objectives of the buyer change. In this manner, a buyer organization may efficiently process invoices in a manner which ensures that timely payment is made while achieving desired financial objectives.

Figure 1:
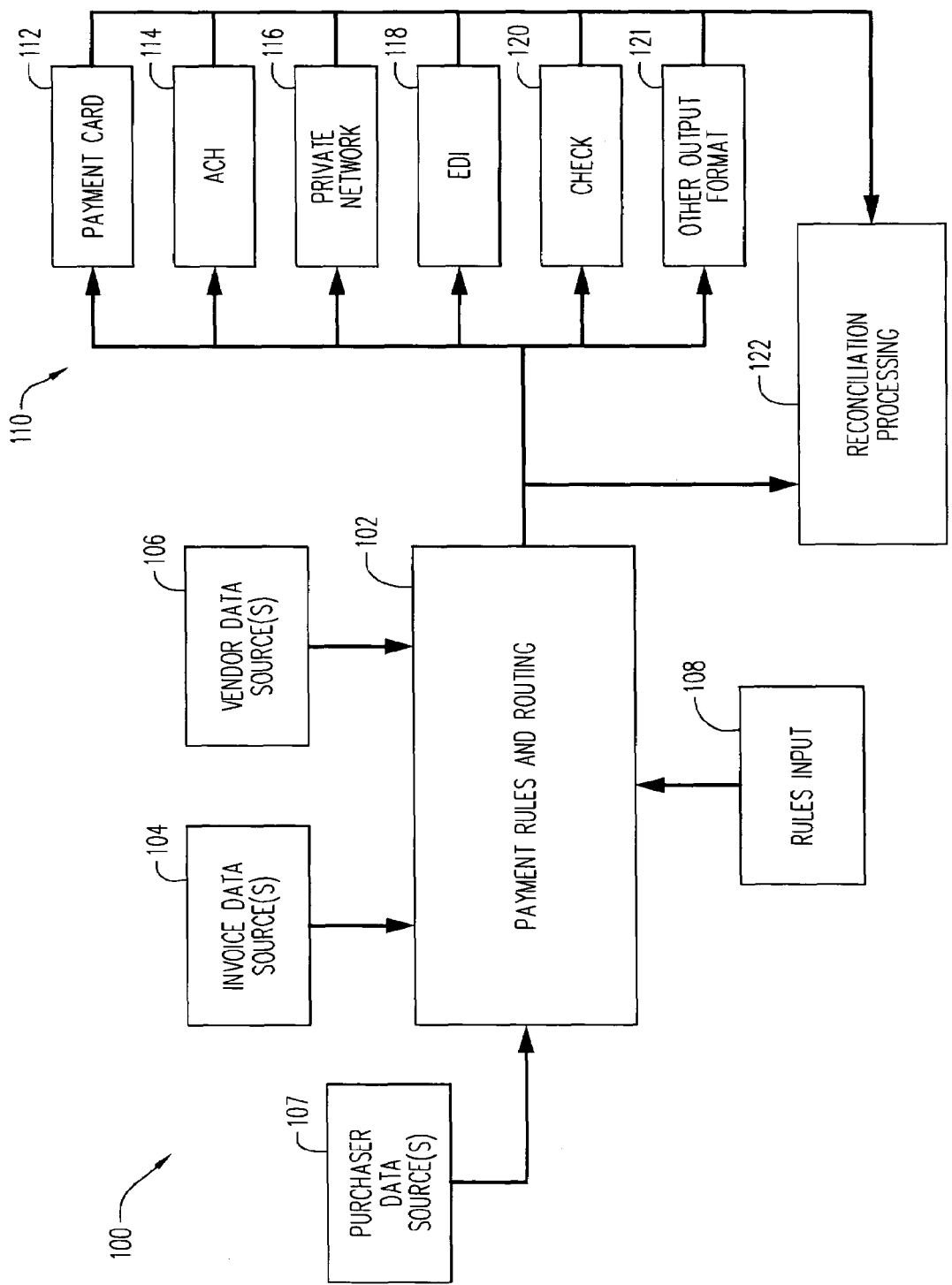
FIG. 1 is a functional block diagram of a computer system which processes accounts payable transactions according to some embodiments.

FIG. 1 is a functional block diagram of a computer system 100 which processes accounts payable transactions according to some embodiments.

The computer system 100 includes a block 102 which determines invoice-by-invoice (or line item by line item) how and when payment is to be made. The determinations made by block 102 are based on one or more rules, and block 102 will accordingly be hereafter referred to as the "payment rules and routing block". As used herein, the term "rule" is used to refer to logic, conditions or criteria that are applied in a situation. For example, a "payment rule" or "settlement rule" may include logic, conditions or criteria that are applied to data from an invoice to determine available payment or settlement options in a given situation.

The payment rules and routing block 102 receives information concerning invoices to be paid from one or more sources 104 of invoice data. The computer system 100 also includes one or more sources 106 of vendor data which provide, to the payment rules and routing block 102, information concerning suppliers for the company which operates the computer system 100.

The purchaser data source 107 stores information relative to buyer data sources, rule configuration, department-related information, as well as additional information which may be relevant to any point within the order, receipt of goods, invoicing or settlement processes. Such data may be used in correlation to existing invoice, vendor or settlement options, and may be provided from the purchaser data source 107 to the payment rules and routing block 102.

The computer system 100 further includes an interface 108 by which one or more users of the computer system may input to the payment rules and routing block 102 one or more rules to govern operation of the payment rules and routing block 102.

In addition, the computer system 100 includes a number of payment mechanisms 110 which are coupled to, and take direction from, the payment rules and routing block 102. The payment mechanisms 110 include a mechanism 112 which is operative to make payments by a payment card system (e.g., Visa or MasterCard).

Another one of the payment mechanisms 110 is a mechanism 114 which operates to make payments via an ACH system. Still another of the payment mechanisms is a mechanism 116 which makes payments by a private network or networks. Yet another payment mechanism is a mechanism 118 which makes payments via EDI. A last one of the payment mechanisms illustrated in FIG. 1 is a mechanism 120 which generates and mails paper checks and/or which makes payments via so-called paperless checks.

Block 121 represents a mechanism for outputting data in one or more additional formats which may be used to transmit to additional systems or settlement options. In addition or alternatively, block 121 may represent an outsort mechanism to which the rules and routing block 102 may route particular invoices for manual review and/or manual handling.

The computer system 100 also includes a reconciliation processing block 122. The reconciliation processing block 122 receives data from the payment rules and routing block 102 concerning payments directed to be made by the payment rules and routing block 102. In addition, the reconciliation processing block 122 receives data from the payment mechanisms 110 concerning details of the payment transactions originated by the payment mechanisms. Based on the data from the payment rules and routing block 102, and the payment mechanisms 110 and also based on data from one or more external financial institutions, the reconciliation processing block performs reconciliation processing to, e.g., confirm the accuracy of information provided by the external financial institution(s), the accuracy of charge-backs to company divisions and departments, etc.

Not all embodiments of the computer system 100 necessarily include all of the different payment mechanisms shown in FIG. 1 and discussed above. Moreover, in addition to or instead of one or more of the payment mechanisms shown, one or more other different payment mechanisms may be included in the computer system. In addition, all data transfers may be conducted in either encrypted or non-encrypted standards.

Figure 2:
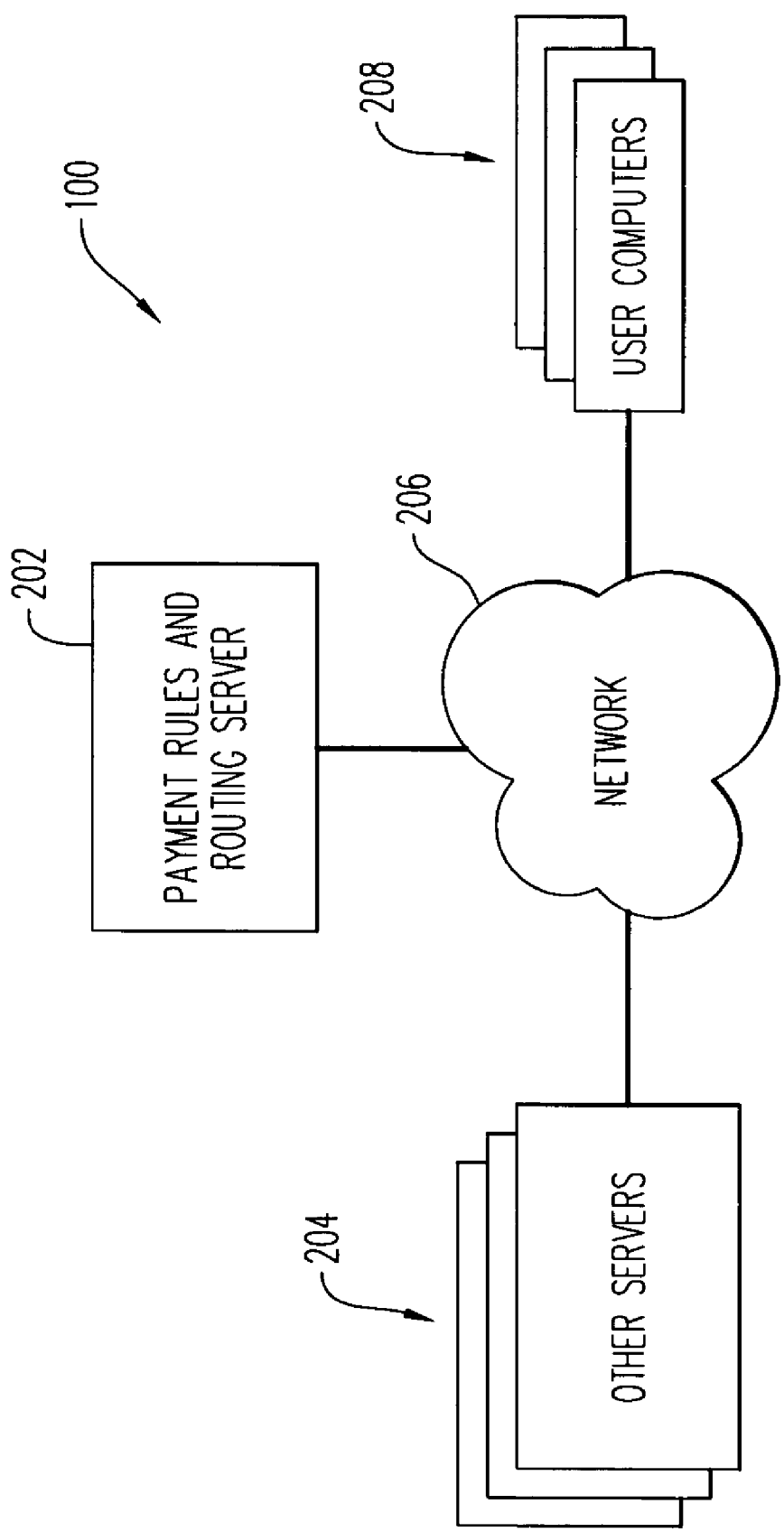
FIG. 2 is a block diagram which illustrates hardware aspects of the computer system of FIG. 1.

FIG. 2 is a block diagram which illustrates hardware aspects of the computer system 100 in accordance with some embodiments.

The computer system 100 may include a server 202 to embody the payment rules and routing block 102 referred to in connection with FIG. 1. In addition, the computer system 100 may include one or more other server computers, indicated generally by reference numeral 204. The other server(s) 204 may be in data communication, at least from time to time, with the payment rules and routing server 202 via a data communication network 206 (which may in practice comprise more than one network). The other server(s) 204 may also be in data communication with each other via the data communication network(s) 206. The other server(s) 204 may implement one or more of the other functional blocks shown in FIG. 1. For example, the other server(s) 204, individually or collectively, may receive, store and transmit data concerning suppliers of the company which operates the computer system 100 and invoices rendered by the suppliers. To do so, the other server(s) 204 may store one or more databases, including one or more of the databases described below. The other server(s) 204 may also include one or more servers to implement the payment mechanisms 110 shown in FIG. 1, as well as the reconciliation processing block 122. In some embodiments, the payment rules and routing server 202 may be at least partially integrated with one or more of the other server(s) 204. Among other functions that may also be relevant, the other server(s) 204 may also implement an Enterprise Resource Planning (ERP) system.

The computer system 100 also may include a number of user computers (generally indicated by reference numeral 208) which may be conventional desktop and/or laptop computers. The user computers 208 may be in data communication via the network(s) 206, at least from time to time, with the payment rules and routing server 202, the other server(s) 204 and/or each other. At least one function that may be performed by one or more of the user computers 208 is definition of payment option selection rules, in a manner to be described below, via an interface provided by the payment rules and routing server 202.

Although three "other servers" 204 are explicitly shown in FIG. 2, the number of such servers may in some embodiments be more or fewer in number than three. Similarly, although three user computers 208 are explicitly shown in FIG. 2, the number of user computers may in some embodiments be more or fewer in number than three.

Figure 3:
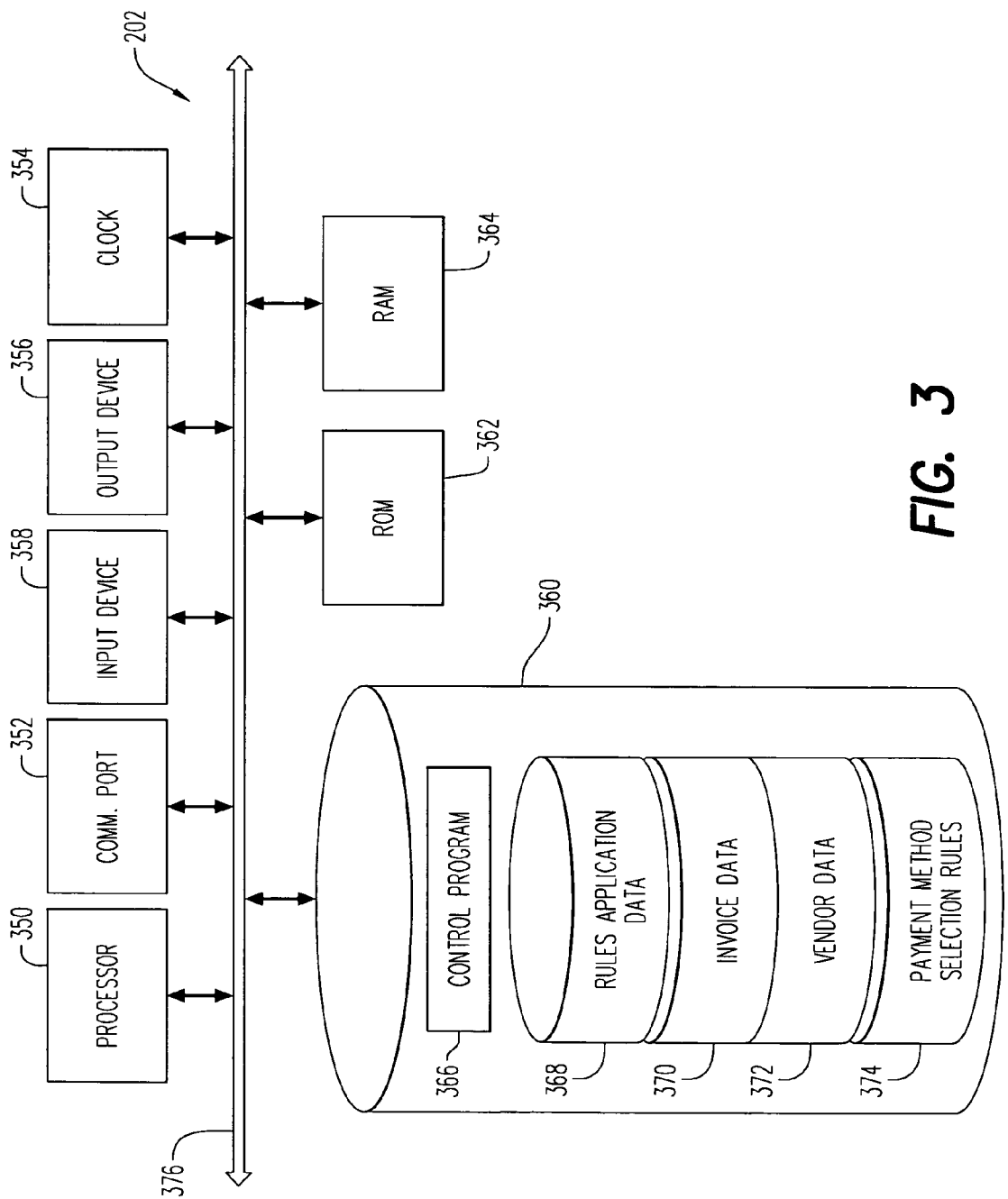
FIG. 3 is a block diagram that shows some details of a server computer that stores and applies rules for selecting payment methods in the computer system of FIGS. 1 and 2.

FIG. 3 is a block diagram which shows some details of a representative example of the payment rules and routing server 202. In some embodiments, the payment rules and routing server 202 may be or include a single device or computer, a networked set or group of devices or computers, a workstation, etc.

In some embodiments, the payment rules and routing server 202 may include a processor, microchip, central processing unit, or computer 350 that is in communication with or otherwise uses or includes one or more communication ports 352 for communicating with other components of the computer system 100. Communication ports may include such things as local area network adapters, wireless communication devices, Bluetooth technology, etc. The payment rules and routing server 202 may also include an internal clock element 354 to maintain an accurate time and date for the payment rules and routing server 202, create time stamps for communications received or sent by the payment rules and routing server 202, etc.

The payment rules and routing server 202 may include one of more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the payment rules and routing server 202 may include a memory or data storage device 360 to store information, software, databases, communications, device drivers, etc. The memory or data storage device 360 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disk and/or a hard disk. The payment rules and routing server 202 also may include separate ROM 362 and RAM 364.

The processor 350 and the data storage device 360 in the payment rules and routing server 202 each may be, for example: (i) located entirely within a single computer or other computing device; or (ii) connected to each other by a remote communication medium, such as a serial port cable, telephone line or radio frequency transceiver. In one embodiment, the payment rules and routing server 202 may comprise one or more computers that are connected to a remote server computer for maintaining databases. At least some of the storage capacity illustrated in FIG. 3 as part of the payment rules and routing server 202 may alternatively be part of one or more of the other server(s) 204 shown in FIG. 2.

A conventional personal computer or workstation with sufficient memory and processing capability may be used as the payment rules and routing server 202. In one embodiment, the payment rules and routing server 202 operates as or includes a Web server for an Internet environment. The payment rules and routing server 202 preferably is capable of high volume transaction processing, performing a significant number of mathematical calculations in processing communications and database searches. A Pentium™ microprocessor such as the Pentium III™ or IV™ microprocessor, manufactured by Intel Corporation, may be used for the processor 350. Equivalent or other processors may be available from Motorola, Inc., AMD, or Sun Microsystems, Inc. The processor 350 may also comprise one or more microprocessors, computers, computer systems, etc.

Software may be resident and operating or operational on the payment rules and routing server 202. The software may be stored on the data storage device 360 and may include a control program 366 for operating the server, databases, etc. The control program 366 may control the processor 350. The processor 350 preferably performs instructions of the control program 366, and thereby operates in accordance with an embodiment of the present invention, and particularly in accordance with methods and other aspects of the invention described herein. The control program 366 may be stored in a compressed, uncompiled and/or encrypted format. The control program 366 further includes program elements that may be necessary, such as an operating system, a database management system and device drivers for allowing the processor 350 to interface with peripheral devices, databases, etc. Appropriate program elements are known to those skilled in the art, and need not be described in detail herein.

The payment rules and routing server 202 may also include or store (e.g., on the data storage device 360) data related to its functions of establishing and applying rules for selecting payment methods for invoices. The stored data may be such as is described below in connection with FIGS. 6-9, including data 368 used in connection with applying payment method selection rules, an invoice database 370, a vendor database 372 and a payment method selection rules database 374. In some embodiments, some or all of one or more of the databases may be stored or mirrored remotely from the payment rules and routing server 202 (e.g., in one or more of the other server(s) 204). Other data may also be stored in the payment rules and routing server 202 in addition to or instead of the data referred to above.

According to some embodiments, the instructions of the control program may be read into a main memory from another computer-readable medium, such as from the ROM 362 to the RAM 364. Execution of sequences of the instructions in the control program causes the processor 350 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware or software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 376.

Figure 4:
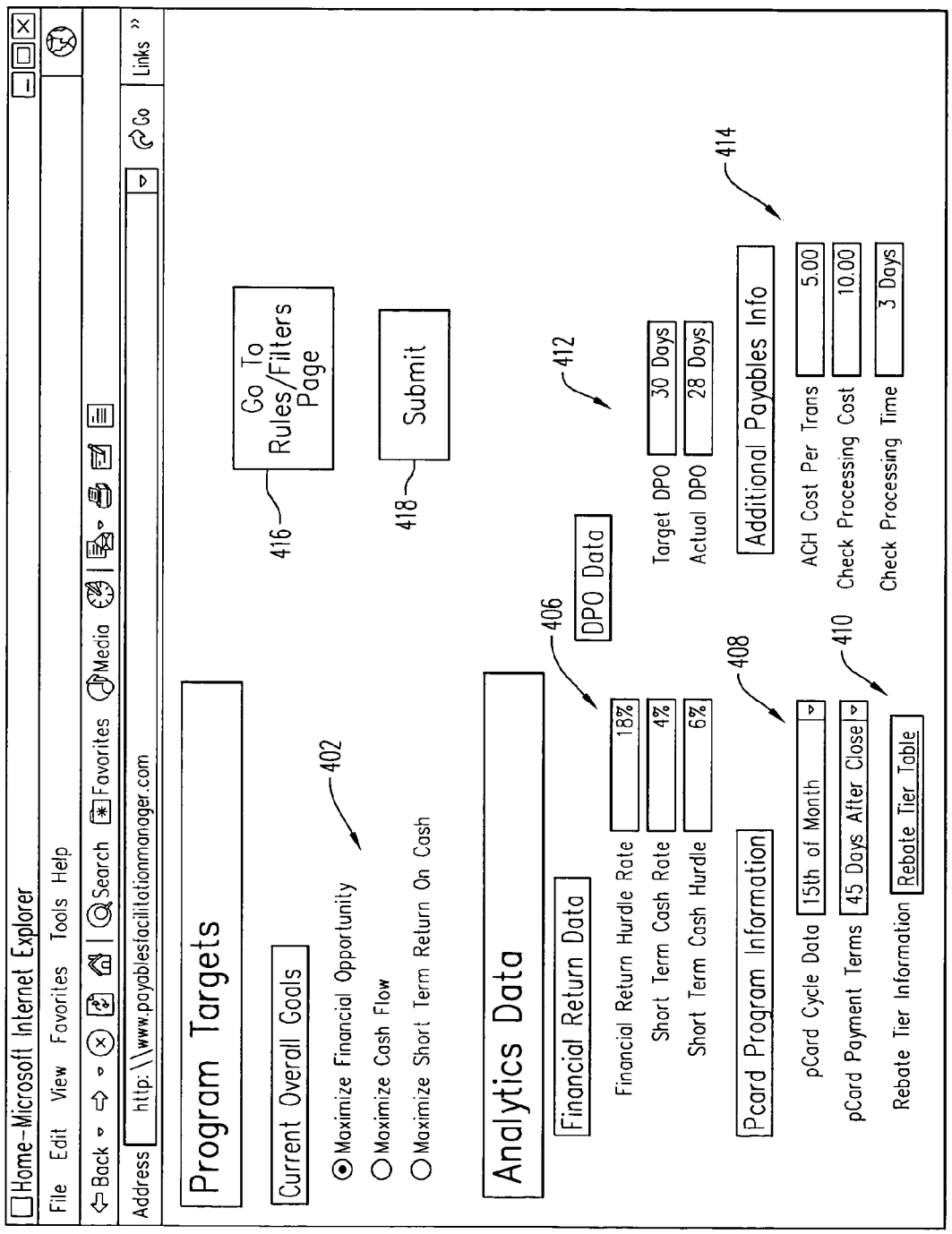
FIGS. 4 and 5 are example screen displays that may be presented as part of a user interface provided by the server computer of FIG. 3.
Figure 5:
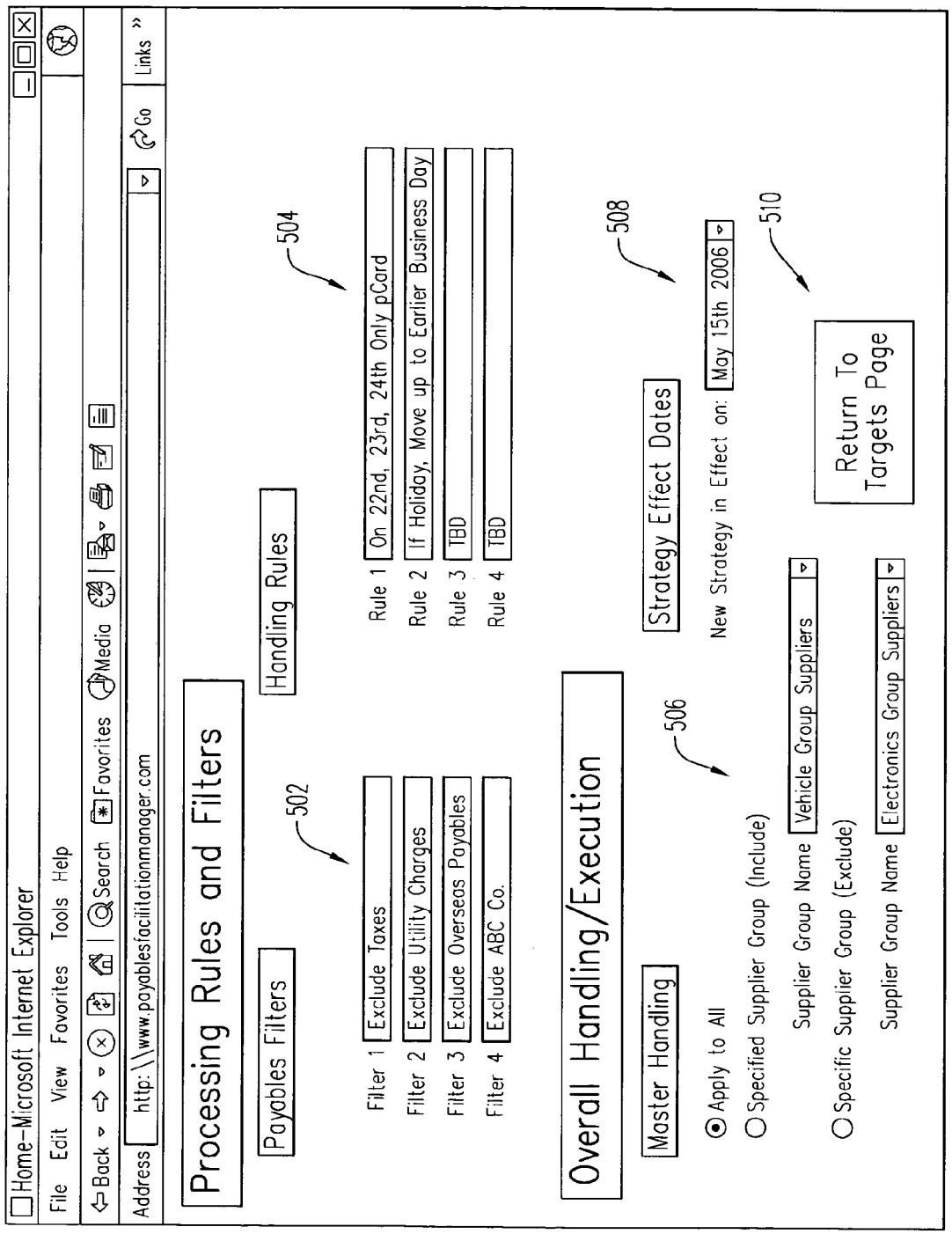

FIGS. 4 and 5 are example screen displays that may be presented as part of a user interface provided by the payment rules and routing server 202 in response to a user of the computer system 100 accessing the payment rules and routing server 202 from one of the user computers 208. In particular, the user may interact with the screen displays of FIGS. 4 and 5 to define a rule for selecting payment methods to be applied by the payment rules and routing server 202. Thus a rule defined by interaction with the screen displays of FIGS. 4 and 5 may be stored, possibly with other such rules, in the payment method selection rules database 374 (FIGS. 3 and 8). Either or both of the screen displays of FIGS. 4 and 5 may be displayed from time to time by one or more of the user computers 208 via a display device or devices (not separately shown) of the user computers 208.

The screen display of FIG. 4 may be presented to the user in response to the user selecting a menu option (not shown) to enter a payment rule definition function. At 402 in the screen display of FIG. 4, are radio buttons that allow the user to select a particular financial objective to be implemented by the rule which the user wishes to define. Among the objectives the user may select from are (a) maximizing financial opportunity by payment method selection, (b) maximizing cash flow by payment method selection; and (c) maximizing the short term return on cash. The last of these three strategies—maximizing the short term return on cash—calls for selecting (and timing) payment methods so as to maximize supplier discounts available for prompt or early payment, while minimizing costs associated with payment transactions. The second strategy—maximizing cash flow—calls for selecting (and timing) payment methods that delay as long as possible each outlay of cash in settlement of invoices. The first strategy—maximizing the financial opportunity—calls for selection and timing of the payment method by taking into account both potential discounts and transaction costs and comparing them with lost financial opportunities entailed by any outlay of cash in settlement of invoices before the absolute latest date of outlay that could be achieved. Other strategies may be individually created and modified to serve various applications of the payment facilitation function such as temporary strategies, or combinations of strategies based on the desire of an individual buying organization to maximize a combination of one or more factors.

For example, a user of the system may review the cash balance sheet toward the end of an accounting period and determine that it is advisable to delay all payments to the latest permissible payment date, thereby increasing the amount of cash retained, but at the cost of failing to capture early payment discounts that may be available. Implementation of this high level strategy may override various vendor-specific preferences.

In another example, a user of the system may determine that a large amount of cash is available and may therefore implement a high level strategy to maximize financial return by paying at times that will maximize capturing of available discounts.

Other factors that may be considered include costs from and/or incentives applicable to specific payment options. In some cases, if a vendor accepts payment by a payment card, interchange fees may apply to the payment card transactions. The interchange fee may be shared among the acquiring bank, the card issuer and the paying entity. This fee, if applicable, and any effective "float" available from payment card payments or other payment methods, may be considered when determining the financial costs/benefits of a particular payment method.

In still other examples, a payment card issuer may offer various levels of discounts according to the amount of data provided by the paying company. In other cases, the paying company may select a payment method that maximizes the amount of data available for reconciliation.

In some cases high level rules may override preferences selected for individual vendors. In other cases each individual vendor preference is unchanged by high level rules, which may be applied only to vendors for which no specific preferences have been entered.

At a lower section 404 of the screen display of FIG. 4, the user is permitted to enter data to be used by the payment rules and routing server 202 in applying the rule presently being defined. At 406 are data entry fields in which the user may enter information such as the financial return hurdle rate, the short term cash earnings rate and the short term cash hurdle rate. This information may be used by the payment rules and routing server 202 to evaluate the financial consequences of selecting and setting the timing for one or more of the available payment options. At 408, there are data fields that allow the user to enter data that indicates terms of payment cycle, payment terms and/or other information concerning arrangements between the user's company and the issuer of the payment card which is one of the available payment options. At 410 is a button to allow the user to call up and populate a pop-up field (not shown) to set forth the rebate structure (if any) agreed to between the user's company and the payment card issuer.

At 412 there are data fields that allow the user to enter target and current actual data concerning the average "days outstanding" for the company's accounts payable. At 414 there are data fields that allow the user to enter data concerning factors such as the per-transaction costs of certain payment options, and/or the lead time required when certain payment options are selected.

In the upper left portion of the screen display of FIG. 4, there is a button 416 that may be actuated by the user to allow the user to navigate to the screen display of FIG. 5, in which additional attributes of the payment method selection rule may be entered.

Referring, then, to FIG. 5, the screen display shown in that drawing includes "filter" fields 502, which the user may employ to limit the applicability of the rule currently being defined. For example, the filter or filters defined at 502 may be used to remove from application of the rule certain classes of payables, such as taxes, utility charges, accounts owed to overseas entities or invoices from one or more specific vendors. Other examples may include specific vendors as designated by SIC code type, strategic relationship with the paying company, payables settled to date, etc.

At 504 there are data fields that allow the user to define "sub-rules" to be included in the rule that is being defined. The "sub-rules" may deal with particular situations that may be encountered when applying the rule that is to be defined.

For example, one sub-rule may call for every invoice subject to the rule to be paid by payment card on certain days of the month. Another sub-rule may provide that payments that would otherwise be scheduled to be made on a holiday should be moved up for payment to the next preceding business day. In some embodiments, the control program 366 (FIG. 3) may include logic to determine the order of application of the various sub-rules. In addition, one or more users of the system may be permitted to customize rules for which data is entered by the user interface illustrated in FIGS. 4 and 5.

At 506 there are radio buttons and associated pull down menus to allow the user to indicate whether the rule now being defined should apply to invoices from all suppliers, or whether applicability of the rule to suppliers should be defined in terms of a group of suppliers included in applicability of the rule or a group of suppliers excluded from applicability of the rule.

At 508 there is a pull down menu to allow the user to indicate a date on which the rule now being defined should come into effect. At 510 there is a button that the user may click to return to the screen display of FIG. 4.

Referring once more to FIG. 4, the screen display shown therein also includes a button 418 that the user may click to indicate that definition of the rule is complete, so that the rule should be stored in the rules database 374 (FIGS. 3 and 8) of the payment rules and routing server 202.

It should be understood that the layout of either or both of the screen displays shown in FIGS. 4 and 5 may be changed in various ways. Other data entry arrangements may be included in the screen displays in addition to or instead of the data entry arrangements shown in the drawings. In addition, a "dashboard" display may be included in either or both of the screen displays to display (e.g., by one or more graphs of one or more types) current operating performance characteristics of the payables processing system.

Vendor database 372, invoice database 370 and rules database 374 will now be described in conjunction with FIGS. 6-8, respectively. In referring to the depiction of the databases in those drawings, note that the first row of the tables which illustrate the databases includes field headers which describe each exemplary field of the database. Fields of data are represented by columns while each of the rows corresponds to one exemplary record of the respective database. One of ordinary skill in the art will readily appreciate that further or fewer fields or records of data, or other combinations of the same, may be used. The databases 372, 370, 374 described herein may also be configured into any number of relational databases. In addition, configurations other than database formats may be used to store the data maintained in exemplary databases 372, 370, 374, such as spreadsheet formats, word processing formats, text-delimited files and the like. Moreover, the format of the rules application data which will be described in connection with FIG. 9 may also be different from that illustrated in the drawing.

Referring now to FIG. 6, the exemplary vendor database 372 may be maintained by the purchasing department of the company which operates the computer system 100. The data for each vendor may be entered into the vendor database 372 by a member or members of the purchasing department each time a vendor is qualified to supply goods and/or services to the company which operates the computer system 100. Some or all of this data may be stored in separate databases; a single database is shown for purposes of explanation.

The exemplary vendor database 372 may include a vendor name field 602, a vendor identifier field 604, a vendor address field 606, a vendor contact individual field 608, a payment terms field 610 and a settlement options field 612. Other fields that may also be present, but are not shown, may include (i) a field for contact information (e.g., e-mail address and/or telephone number) for the vendor individual contact indicated in field 608, (ii) target, destination and/or payee identifier information for use in connection with one or more of the settlement options indicated in field 612, (iii) strategic nature and relationship of the vendor, and (iv) captured data and information on the number of invoices and amount settled with the vendor for year to date and/or at end of year.

Vendor name field 602 may be used to store the name of the vendor for which the record in question is maintained. Vendor identifier field 604 may be used to store an identifier for the vendor in question. The vendor identifier may be automatically generated by the computer system 100 at the time the vendor record is created in the database 372. Each vendor identifier may be a unique alphabetic, numeric, alpha-numeric, binary or other code.

Vendor address field 606 may be used to store the mailing address of the vendor in question. Vendor contact individual field 608 may be used to store the name(s) of one or more individual employees of the vendor who may be contacted with any issues regarding the relationship between the vendor and the company which operates the computer system 100.

Payment terms field 610 may be used to store data indicative of the payment terms that have been negotiated with the vendor to be generally applicable to invoices rendered by the vendor to the company which operates the computer system 100. The payment terms may include how many days after the date of the invoice payment of the invoice falls due, as well as amounts of discounts (e.g., percentages) that are available for early payment by a specified number or numbers of days prior to the final payment due date.

Settlement options field 612 may be used to store data indicative of the settlement options (payment methods) supported by the relationship between the vendor and the company which operates the computer system 100. In some cases, the vendor may have agreed and arrangements may be in place to support all of the payment methods supported by the computer system 100. In other cases, the relationship between the vendor and the company which operates the computer system, and/or the vendor's capabilities, may limit the options available for settlement of invoices rendered by the vendor. In the case of some vendors, the standing arrangement between the vendor and the company may specify a single payment method for all invoices rendered by the vendor in question.

For example, one or more rules previously entered into the system may call for settlement of an invoice or line item via a payment card, but the arrangement with the vendor may be such that payment by payment card is not available for the particular vendor. In such a case, the invoice may be settled by the next preferred settlement method (as determined by the applicable rule/strategy), such as ACH settlement with a discount.

Turning now to FIG. 7, the exemplary invoice database 370 may be maintained by the accounting/accounts payable department of the company which operates the computer system 100. The record for each invoice may be generated at the time when the invoice is received by the company which operates the computer system 100. In at least some cases, the vendor may have presented the invoice electronically, possibly via a suitable electronic invoice procurement and presentment (EIPP) system, with which the payment rules and routing server 202 and/or one or more of the other server(s) 204 is interfaced. Thus at least some of the information for the record may be taken from data received from the vendor. Some or all of this data may be stored in separate databases;

a single database is shown for purposes of explanation. Data may also be received directly from an enterprise resource planning (ERP) system or one or more other commonly used procurement, accounts payable, customer relationship management systems or other systems, including e.g. legacy computer systems.

The exemplary invoice database 370 may include a vendor identifier field 702, an invoice identifier field 704, a purchase order number field 706, an invoice (payment) dollar amount field 708, a vendor transaction reference number field 710, and a payment terms field 712. Although not shown in the drawing, the invoice database 370 may also include additional fields, including for example fields such as selected payment method and scheduled payment date to be populated upon determination of those attributes by the payment rules and routing server 202 as described below. Further fields that may also be present (though not shown) and that may be populated later may include actual payment date and payment transaction identifier (e.g., check number or remittance identifier), as determined or established by the particular one of the payment mechanisms 110 selected by the payment rules and routing server 202. Another field that may be present but is not shown may store the date of presentment of the invoice. The date of presentment may be the base from which there may be calculated the payment due date and/or any date of payment required to earn a discount.

Vendor identifier field 702 may be used to store the identifier for the vendor who rendered the invoice that is the subject of the current record. Invoice identifier field 704 may be used to store an identifier for the invoice in question. The invoice identifier may be automatically generated by the computer system 100 at the time the invoice record is created in the database 370. Each invoice identifier may be a unique alphabetic, numeric, alpha-numeric, binary or other code. Purchase order number field 706 may be used to store a purchase order number or other identifier that corresponds to the purchase order filled by goods or services for which the current invoice is rendered.

Payment amount field 708 may be used to store the dollar amount of the current invoice, and thus indicates the amount of the payment that is to be made, but without taking into account any discount that may be earned by early payment. Vendor transaction reference number field 710 may store the vendor's invoice number for the current invoice or any other identifier assigned to the invoice by the vendor. This data may be transmitted with the payment to allow the vendor to match the payment to the invoice.

Payment terms field 712 may be used to store data that indicates whether the standard payment terms in place between the vendor and the company that operates the computer system 100 are applicable to the current invoice, or if not, what payment terms have been established for the present invoice on an ad hoc basis.

Referring to FIG. 8, the exemplary payment method selection rules database 374 may be generated by the payment rules and routing server 202 based on input from one or more users of the computer system 100 to define one or more payment method selection rules. Some or all of this data may be stored in separate databases; a single database is shown for purposes of explanation.

The exemplary payment method rules database 374 may include a rule identifier field 802, a strategy field 804, an "all-but" flag field 806, a supplier-groups-excluded field 808, an "only-for" flag field 810 and a supplier-groups-included field 812. Other fields may be present (though not shown) as required to store other rule definition attributes, including for example rule definition attributes of the types indicated in the above discussion of FIGS. 4 and 5.

Rule identifier field 802 may be used to store an identifier, generated by the payment rules and routing server 202, at the time the rule definition is complete and the record for the rule is stored in the payment method selection rules database 374.

Strategy field 804 may be used to store an indication of the type of financial strategy to be applied by the rule represented by the current record. The indicated financial strategy may be one of the three strategies described above in connection with the radio buttons 402 shown in FIG. 4.

The "all-but" flag field 806 is provided to store an indication as to whether the rule represented by the current record is applicable to invoices from all suppliers except for invoices from supplier groups listed in supplier-groups-excluded field 808. If the "all-but" flag is asserted in the current record, then there should be data in the supplier-groups-excluded field 808 so that the excluded supplier groups are indicated.

The supplier-groups-excluded field 808 may be used to store data that indicates the supplier groups (if any) excluded from application of the rule represented by the current record.

The "only-for" flag field 810 is provided to store an indication as to whether the rule represented by the current record is applicable to invoices from suppliers in a certain supplier group or groups enumerated in the supplier-groups-included field 812. If the "only-for" flag is asserted in the current record, then there should be data in the supplier-groups-included field 812 so that the included supplier groups are indicated. In some cases, a rule may be applicable to only a single vendor. (However, it should be noted that included supplier groups need not be explicitly indicated if either the "all-but" flag is asserted, or if neither the "all-but" flag is asserted nor the "only-for" flag is asserted. In the latter case, the rule represented by the current record is applicable to invoices from all suppliers.)

The supplier-groups-included field 812 may be used to store data that indicates the supplier groups explicitly included for application of the rule represented by the current record.

Referring now to FIG. 9, this drawing illustrates an example format for the rules application data 368; other formats may alternatively be employed. The rules application data 368 includes financial hurdle rate data 902, short term cash rate data 904, and short term hurdle rate data 906. These three data elements may be employed, if the "maximize financial opportunity" strategy applies, in the case of a specific invoice to evaluate the benefit of capturing a discount by early payment against the opportunity cost arising from parting with cash before the payment due date.

The rules application data 368 may further include target "days payables outstanding" (DPO) data 908 and actual DPO data 910. In some embodiments, a rule-based determination of the date on which payment is made may be overridden if that determination would cause a departure from the DPO target.

The rules application data 368 may also include cash-and-equivalents-available data 912. Again, a rule-based determination (in this case, as to either payment method or timing) may be overridden if enough cash/equivalents aren't available to support the determination called for by the rule. For example, if there is a shortage of cash, a rule determination to pay early to obtain a discount may be overridden in favor of delaying payment to the due date. In another case, a cash shortage may lead the payment rules and routing server 202 to override a rule-directed determination to select one payment method in favor of another payment method that would allow for a delay (relative to the first payment method) in the actual disbursement of cash.

The rules application data 368 may include other types of data, in addition to or instead of one or more of the data types illustrated in FIG. 9. For example, the other types of data included in the rules application data 368 may include one or more of the types of data input by the user via the interface display screens of FIGS. 4 and 5.

One or more other databases may also be stored in the system. For example, an additional database may be provided which stores preferences/requirements for each department or purchasing unit within the company that maintains the system. Such data may include, for example, preferences in regard to the handling of taxes, shipping charges, etc.

Figure 10:
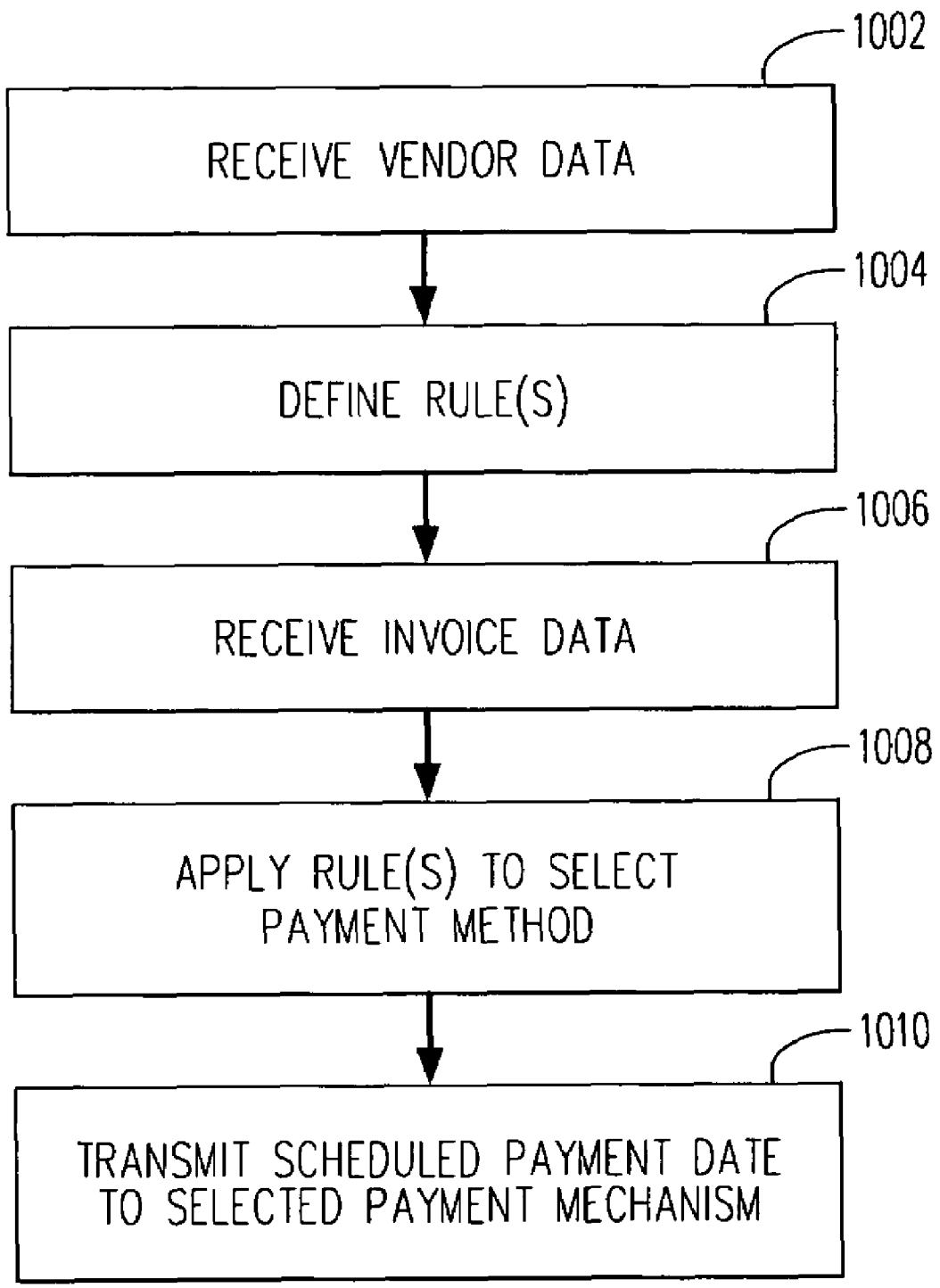
FIG. 10 is a flow chart that illustrates a process that may be performed in accordance with embodiments of the invention in the computer system of FIGS. 1 and 2 and/or in the server computer of FIG. 3.

FIG. 10 is a flow chart that illustrates a process that may be performed in accordance with embodiments of the invention in the computer system 100 and/or in the payment rules and routing server 202.

At 1002, the computer system 100 and/or the payment rules and routing server 202 receives at least some of the data required to populate the vendor database 372.

At 1004, the payment rules and routing server 202 receives from a user of the computer system 100 input needed to define at least one payment method selection rule to be stored in the rules database 374 and to be applied by the payment rules and routing server 202. The rule definition data may be received as a result of the user's interaction, via one of the user computers 208, with either or both of the user interface display screens shown in FIGS. 4 and 5.

At 1006, the computer system 100 and/or the payment rules and routing server 202 receives at least some of the data required to populate a record for a particular invoice rendered by one of the suppliers to the company which operates the computer system 100. This information may be received as the result of the supplier presenting the invoice for payment, either by mail or electronically. The invoice data may be initially present in one or more of the servers 204 (FIG. 2) and may be fed to the payment rules and routing server 202 invoice-by-invoice or in batches. Presentment of the invoice and the resulting receipt of data to populate the record for the invoice may trigger the payment rules and routing server 202 to apply (as indicated at 1008) a relevant payment method selection rule to the invoice. By applying the payment method selection rule to the invoice, the payment rules and routing server 202 selects a payment method to be used in paying the invoice. At 1010, the payment rules and routing server 202 transmits information to the particular one of the payment mechanisms 110 that implements the payment method selected at 1008. The transmitted information may include one or more of the scheduled payment date, the invoice identifier, the vendor's transaction reference, and the payment amount (reflecting, for example, any discount to be captured by early payment).

It will be understood that in response to the information transmitted thereto, the payment mechanism 110 which receives the information implements and/or schedules payment by the payment method selected by the payment rules and routing server 202. A payment scheduled by the payment mechanism 110 for a later time immediately in response to receiving the information from the payment rules and routing server 202 may be later implemented by the payment mechanism 110 at the scheduled later time without further input from the payment rules and routing server 202 as to that particular payment.

Figure 11:
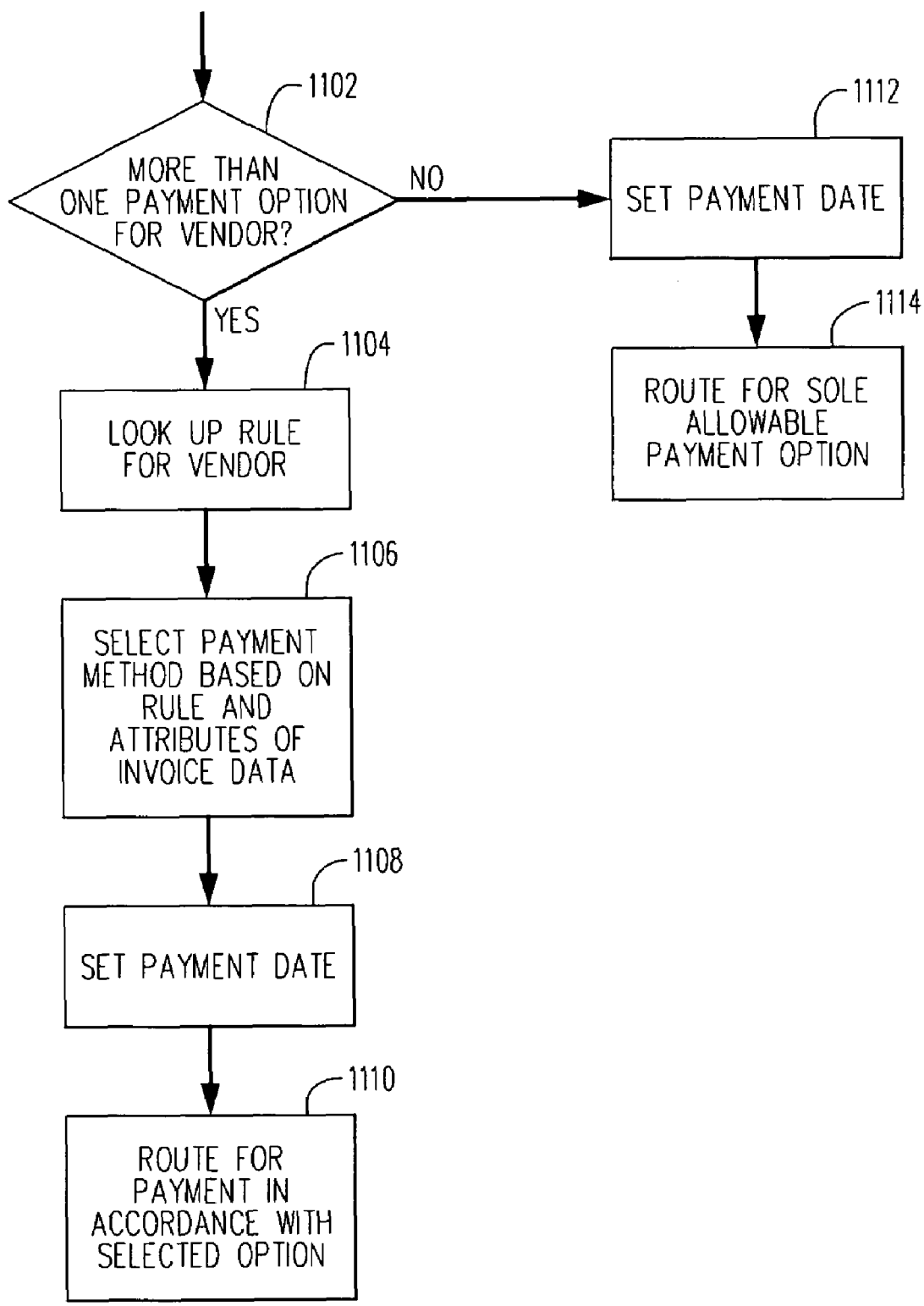
FIG. 11 is a flow chart that illustrates some details of the process of FIG. 10.

FIG. 11 is a flow chart that illustrates some details of the process of FIG. 10. It is assumed for purposes of FIG. 11 that the process details illustrated therein are prompted by the payment rules and routing server 202 receiving data indicative of an invoice that has been presented by a supplier to the company which operates the computer system 100.

At 1102, the payment rules and routing server 202, or another component of the computer system 100, accesses (directly or indirectly) the record for the supplier in the vendor database to determine whether the relationship with the supplier supports more than one payment option. If so, then at 1104, the payment rules routing server accesses the payment method selection rules database 374 to look up a payment method selection rule that is relevant to the supplier in question. At 1106, the payment rules and routing server 202 selects a payment method for the current invoice on the basis of the rule that was looked up at 1104. At 1108, the payment rules and routing server 202 sets the payment date for the current invoice on the basis of the rule that was looked up at 1104. At 1110, the payment rules and routing server 202 routes the invoice (or data representative of the invoice) to the appropriate one of the payment mechanisms 110 to execute the method of payment selected at 1106. In routing the invoice data to the appropriate payment mechanism 110, the payment rules and routing server 202 may also indicate the date on which the payment for the invoice is to be made, in accordance with the date set at 1108.

Considering again the determination made at 1102, if only one payment method is available for the current invoice, then the payment date for the invoice is set at 1112. This, too, may be done on the basis of a rule, which may be looked up as in step 1104. Following 1112, the invoice data is routed (as indicated at 1114) to the payment mechanism 110 that corresponds to the sole available payment method.

A more specific example of operation of the system will now be provided. For purposes of this example, assume that the invoice payment system receives an invoice on the third day after issuance of the invoice. The applicable payment terms are 2% 10, net 30. The system then operates to select a payment method in accordance with the paying company's overall objectives. Numerous payment options may be available depending on the strategy that is currently in place.

The invoice is processed and compared against the applicable rules and filters that have been entered into the system. Among other calculations, the number of days the invoice has been in the system is calculated. The short term cash rate hurdle is noted and the system then calculates the percentage of annualized discount that would be captured if the invoice were paid immediately. At the same time, the system calculates the effect on the paying company's cash position if the invoice were to be held and not paid until the final due date. A further calculation may indicate how payment of the invoice by payment card would affect the rebate that might be available from the card issuer to the paying company based on the payment card rebate structure.

With all of this information calculated by the system, the system selects a payment option in accordance with the cash or other financial strategy that has been entered into the system.

Although the method steps are shown in FIGS. 10 and 11 in a particular order, the drawings and the accompanying discussion thereof is not intended to imply a fixed order of steps. Rather, the method steps may be performed in any order that is practicable. In one or more practical embodiments, one or more of the steps may be performed repeatedly, e.g., before or after one or more other steps. For example, one or more of the steps may be performed virtually continuously, at frequent intervals or at infrequent intervals. For example, new suppliers may be added to the computer system 100 on an ongoing basis and/or existing suppliers may be purged from the system, either individually or in batches. Invoices may be received on a daily basis; consequently the payment method (settlement method) selection rules may be applied daily to select settlement methods and schedule payment dates. One or more rules may be defined from time to time as needed.

The computer system 100 may also include functionality to facilitate the workflow for invoices/payment transactions. For example, when an invoice is queued for payment by the computer system 100, it may be the case that one or more individuals are notified of this fact. These individuals may be permitted to exercise a manual override over the scheduling/selected settlement method as automatically determined by the computer system 100. Manual override may be subject to one or more levels of management review, and such may also be the case with respect to determinations automatically made by the computer system 100.

As an alternative or supplement to selecting payment methods invoice-by-invoice, the system may select payment options line-item-by-line-item within an invoice. For example, if an invoice is received for which only partial delivery of goods have been made, a payment method may be selected for the line item(s) for which the goods have been received. When the delivery of the items is later completed, application of the then-applicable rules/strategies may call for a different payment method to be used for the line item(s) not previously paid.

In another example, an invoice may cover items purchased by two different departments within a company, which may be pursuing different strategies, or which may have different arrangements in place with the vendor. Accordingly, different payment methods may be selected for the various invoice line items. As still another example, some items in an invoice may be capital items while others are expensed (e.g., computer hardware versus software), which may lead to selection of different payment methods for the various line items.

Not all payment selection decisions made by the system may necessarily be based, or exclusively based, on financial considerations. For example, where the invoice has been rendered by a related company, other payment rules may apply.

As used herein and in the appended claims, "database" may refer to one or more related or unrelated databases. Data may be "stored" in raw, excerpted, summarized and/or analyzed form.

The technical effect of the system and methods disclosed herein is to improve the efficiency and/or financial performance of computerized accounts payable systems.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented method, comprising:
    accessing, by a hardware server, a first invoice stored on an invoice database, wherein said first invoice is associated with a first vendor;
    loading, by said hardware server, said first invoice from said invoice database into a computer memory coupled with said hardware server memory;
    parsing, by a control program, a plurality of first invoice line items from said first invoice into first invoice data, wherein said computer program is executed at least partially by said hardware server;
    analyzing, by said control program, said first invoice data, vendor rule data and payment selection rule data to determine a first settlement rule, wherein said payment selection rule data comprises payment rules to at least one of maximize cash flow for a payer, maximize short-term return on cash for a payer of said first invoice, maximize vendor discounts, or minimize transaction costs associated with paying said first invoice;
    selecting, by said control program and based upon said first settlement rule, a first settlement option from a plurality of settlement options to settle said first invoice;
    applying, by said control program, said first settlement option to said first invoice to facilitate settling said first invoice;
    accessing, by said hardware server, a second invoice stored on said invoice database wherein said second invoice is associated with a second vendor;
    loading, by said hardware server, said second invoice from said invoice database into said computer memory;
    parsing, by said control program, a plurality of second invoice line items from said first invoice into second invoice data, wherein said computer program is executed at least partially by said hardware server;
    analyzing, by said control program, said first invoice data, said vendor rule data and said payment selection rule data to determine a second settlement rule;
    selecting, by said control program and based upon said second settlement rule, a second settlement option from said plurality of settlement options to settle said second invoice, wherein said second settlement option is different from said first settlement option; and,
    applying, by said control program, said second settlement option to said second invoice to facilitate settling said second invoice.

2. The method of claim 1, wherein said first settlement rule and said second settlement rule are the same settlement rule for facilitating settling at least one of said first invoice or said second invoice.

3. The method of claim 1, wherein said analyzing said first invoice data further comprises analyzing data parsed from a first line item of said first invoice and a second line item of said first invoice.

4. The method of claim 1, wherein said second settlement rule is based upon analyzing said first invoice data and said second invoice data.

5. The method of claim 1, further comprising receiving information related to at least one of said first settlement rule or said second settlement rule via a graphical user interface.

6. The method of claim 1, wherein at least one of said first settlement rule or said second settlement rule are based upon further analyzing at least one of accounts payable data, accounts receivable data, general ledger account data, or enterprise resource planning data to determine a cash position of said payer.

7. The method of claim 1, wherein at least one of said first settlement rule or said second settlement rule comprises at least one of a first strategic option or a second strategic option;
    wherein said first strategic option comprises maximizing financial performance with respect to payment of at least one of said first invoice or said second invoice by comparing a financial benefit of delaying payment of an invoice with a financial benefit of not delaying payment of said invoice; and,
    wherein said second strategic option comprises delaying as long as possible cash outlays with respect to settlement of invoices.

8. The method of claim 1, further comprising receiving vendor data from a plurality of vendors and associating said vendor data with at least one of said first settlement rule or said second settlement rule.

9. The method of claim 1, further comprising associating said first vendor with at least one of said first settlement rule or said second settlement rule.

10. The method of claim 1, wherein said selecting said first settlement option is based at least in part on an invoice attribute of at least one of said first invoice or said second invoice.

11. The method of claim 1, wherein said analyzing said first invoice data is further based upon at least one of a due date, invoice date, shipped date, received date, discount term, a discount available for early payment, total value, settlement restriction, late fee, settlement options, cost of funds, financial return hurdle rate, short term cash earnings rate, short term cash hurdle rate, payment timing, terms of payment cycle, payment terms, issuer arrangements, rebate structure, per-transaction costs, required lead time, classes of payables, taxes, utility charges, accounts owed to overseas entities, vendor, SIC code type, strategic relationship with a paying company, or payables settled to date.

12. The method of claim 1, further comprising determining a first subrule related to payment timing and selecting said first settlement option based upon said first settlement rule and said first sub-rule.

13. The method of claim 1, wherein said selecting said first settlement option is based at least in part on a vendor attribute of said first vendor.

14. The method of claim 1, wherein said selecting said first settlement option is based at least in part on a vendor attribute of said first vendor, wherein said vendor attribute is a list of settlement options approved for said first vendor.

15. The method of claim 1, further comprising providing a list of settlement options for said first settlement rule.

16. The method of claim 1, wherein said plurality of settlement options comprises at least one of payment by electronic payment, payment by check, payment by payment card, payment by wire transfer, payment by automatic clearing house (ACH), payment by electronic data interchange (EDI) or payment by private network.

17. The method of claim 1, wherein said first settlement option comprises settling at least a portion of said first invoice by at least one of payment by electronic payment, payment by check, payment by payment card, payment by wire transfer, payment by automatic clearing house (ACH), payment by electronic data interchange (EDI) or payment by private network.

18. An apparatus for paying invoices, comprising:
a processor; and
a memory in operative communication with said processor, said memory for storing a plurality of processing instructions enabling said processor to:
access a first invoice stored on an invoice database, wherein said first invoice is associated with a first vendor;
load said first invoice from said invoice database into said memory;
parse a plurality of first invoice line items from said first invoice into first invoice data;
analyze said first invoice data, vendor rule data and payment selection rule data to determine a first settlement rule, wherein said payment selection rule data comprises payment rules to at least one of maximize cash flow for a payer, maximize short-term return on cash for a payer of said first invoice, maximize vendor discounts, or minimize transaction costs associated with paying said first invoice;
select, based upon said first settlement rule, a first settlement option from a plurality of settlement options to settle said first invoice;
apply said first settlement option to said first invoice to facilitate settling said first invoice;
access a second invoice stored on said invoice database wherein said second invoice is associated with a second vendor;
load said second invoice from said invoice database into said memory;
parse a plurality of second invoice line items from said first invoice into second invoice data;
analyze said first invoice data, said vendor rule data and said payment selection rule data to determine a second settlement rule;
select, based upon said second settlement rule, a second settlement option from said plurality of settlement options to settle said second invoice, wherein said second settlement option is different from said first settlement option; and, apply said second settlement option to said second invoice to facilitate settling said second invoice.

19. A tangible computer-readable medium having stored thereon computer-executable instructions that, if executed by a computing device, cause said computing device to perform a method comprising:
accessing a first invoice stored on an invoice database, wherein said first invoice is associated with a first vendor;
loading said first invoice from said invoice database into a computer memory;
parsing a plurality of first invoice line items from said first invoice into first invoice data;
analyzing said first invoice data, vendor rule data and payment selection rule data to determine a first settlement rule, wherein said payment selection rule data comprises payment rules to at least one of maximize cash flow for a payer, maximize short-term return on cash for a payer of said first invoice, maximize vendor discounts, or minimize transaction costs associated with paying said first invoice;
selecting, based upon said first settlement rule, a first settlement option from a plurality of settlement options to settle said first invoice;
applying said first settlement option to said first invoice to facilitate settling said first invoice;
accessing a second invoice stored on said invoice database wherein said second invoice is associated with a second vendor;
loading said second invoice from said invoice database into said computer memory;
parsing a plurality of second invoice line items from said first invoice into second invoice data;
analyzing said first invoice data, said vendor rule data and said payment selection rule data to determine a second settlement rule;
selecting, based upon said second settlement rule, a second settlement option from said plurality of settlement options to settle said second invoice, wherein said second settlement option is different from said first settlement option; and,
applying said second settlement option to said second invoice to facilitate settling said second invoice.

* * * * *